US007689491B2

(12) United States Patent
Coates

(10) Patent No.: US 7,689,491 B2
(45) Date of Patent: Mar. 30, 2010

(54) SYSTEMS AND METHODS FOR PORTABLE ALPHA-PLUS FIXED INCOME PRODUCTS

(75) Inventor: John S. Coates, Villanova, PA (US)

(73) Assignee: Morgan Stanley, New York, NY (US)

( * ) Notice: Subject to any disclaimer, the term of this patent is extended or adjusted under 35 U.S.C. 154(b) by 676 days.

(21) Appl. No.: 11/098,813

(22) Filed: Apr. 5, 2005

(65) Prior Publication Data

US 2005/0228731 A1   Oct. 13, 2005

Related U.S. Application Data

(60) Provisional application No. 60/561,862, filed on Apr. 13, 2004.

(51) Int. Cl.
*G06Q 40/00* (2006.01)
(52) U.S. Cl. .................................... 705/36 R
(58) Field of Classification Search ............... 705/35
See application file for complete search history.

(56) References Cited

U.S. PATENT DOCUMENTS

| 6,049,772 | A* | 4/2000 | Payne et al. ............... 705/4 |
| 7,016,870 | B1* | 3/2006 | Jones et al. ............... 705/35 |
| 2003/0046208 | A1* | 3/2003 | Lubking et al. ............ 705/36 |
| 2004/0243499 | A1* | 12/2004 | Bateson et al. ............ 705/35 |
| 2006/0253360 | A1* | 11/2006 | Gould ..................... 705/35 |
| 2006/0271453 | A1* | 11/2006 | Landle et al. ............. 705/35 |
| 2007/0055598 | A1* | 3/2007 | Arnott et al. ............. 705/35 |

OTHER PUBLICATIONS

Petzel, Togo E. Portable alpha travels new roads, Apr. 17, 2000, Pension & Investments, vol. 28, Issue 8, p. 40.*
Chernoff, J. Bernstein amends policy portfolio mantra, Sep. 1, 2003, Pensions & Investments, vol. 31, Issue 18, p. 3.*
Ruyter, T. Mixing Alphas and Betas, Jul. 1998, Global Finance, vol. 12, Issue 7, p. 8.*
Robert, Arnott D. Risk budgeting and portable alpha, Journal of Investing, Summer 2002, vol. 11, Issue 2, p. 15.*
Stapleton, J. Perplexed by portable alpha. Golbal Investor. London, Mar. 2004, p. 1.*
Veith, Perry J. New horizons in bonds: Fixed income strategies reduce risk and increase returns, Canadian Investment Review, Toronto, Summer 2002, vol. 15, Issue 2, p. 45.*
Kung, Edward: Portable Alpha—Philosophy, Process and Performance, Journal of Portfolio Management, Spring 2004.*
Kung et al.: Portable Alpha—Philisophy, Process & Performance, Spring 2004, Journal of Portfolio Management, pp. 78-87.*
"Alpha Transport with Derivatives"—Bruce Jacobs et al., The Journal of Portfolio Management, May 1, 1999.

(Continued)

*Primary Examiner*—Hani Kazimi
*Assistant Examiner*—Bijendra K Shrestha
(74) *Attorney, Agent, or Firm*—K&L Gates LLP

(57) ABSTRACT

A financial product. The financial product includes a fixed income component and an alpha engine component. The fixed income component is structured to provide asset-liability matching and/or spending rule benefits. The alpha engine component includes an investment in an alpha-generating portfolio. The investment includes a cash investment and/or a derivative investment in the alpha-generating portfolio.

17 Claims, 4 Drawing Sheets

OTHER PUBLICATIONS

"Alpha Transport Strategies"—Nevin Adams, Plan Sponsor Magazine, Feb. 1997.

"Portable Alpha Overlay Via PanAgora's Fixed Income Active Core Strategy"—Edgar Peters et al., PanAgora Asset Management Brochure, 2002.

"Overlay Portfolio Management in a Multi-Manager Account"—David Stein et al., Journal of Wealth Management, Spring 2003.

"The Investment World is Changing"—Ray Dalio et al., Bridgewater Daily Observations, Apr. 25, 2003.

"The Flood into Hedge Funds"—Greg Jensen et al., Bridgewater Daily Observations, May 9, 2003.

"The New Investment Paradigm"—Ray Dalio, Institutional Investor, Jun. 2003.

"Hedge Funds Selling Beta as Alpha"—Greg Jensen et al., Bridgewater Daily Observations, Jun. 17, 2003.

"Post Modern Portfolio Theory—Engineering Targeted Returns and Risks"—Ray Dalio, Bridgewater Associates Brochure, 2003.

"Real Innovation—The future of pension fund investing rests with 'high-octane' specialists that plan executives will hire after first determining their risk budgets"—Joel Chernoff, Pensions & Investments, Oct. 27, 2003.

"A New Paradigm for Today's Challenges"—Bob Litterman, Goldman Sachs Brochure, 2003.

"Portable Alpha—Philosophy, Process & Performance"—Edward Kung et al., The Journal of Portfolio Management, Spring 2004.

"Separation Anxiety"—Andrew Capon, Institutional Investor, Dec. 2003.

"How Dalio's Bridgewater Wooed the Pension Funds"—Lain Jenkins, Absolute Return, vol. 2 Issue 1, Apr. 2004.

* cited by examiner

SYSTEMS AND METHODS FOR PORTABLE ALPHA-PLUS FIXED INCOME PRODUCTS

CROSS-REFERENCE TO RELATED APPLICATION

This application claims the priority benefit of U.S. Provisional Application No. 60/561,862, which was filed on Apr. 13, 2004 and is incorporated by reference in its entirety.

BACKGROUND

This application is related, generally and in various embodiments, to enhanced financial methods, products, and systems for managing fixed income portfolios. Alpha refers to the deviation of the return that an active investment manager can generate compared with the passive return of the asset class exposure of the manager's portfolio. For example, the alpha of an equity manager (e.g., stock manager) with an S&P 500 beta of 1.0 would be the net return after fees of the manager's portfolio above or below the return of the S&P 500. The alpha of a fixed income manager (e.g., bond manager) would be the net return above or below a relevant benchmark (e.g. the Lehman Aggregate Index).

Portable alpha in the context of this application refers to a combination of a direct or derivative investment in a portfolio designed specifically to generate alpha with low levels of embedded stock and bond exposures (an "alpha engine") and a direct or derivative investment in a portfolio designed to generate fixed income exposures that together with those embedded in the alpha engine will equal the fixed income characteristics specified by a client. This combination of an alpha engine and investments designed for fixed income exposures is expected to generate higher average returns over time than would be expected from an investment only in a traditional fixed income portfolio having the characteristics specified by a client.

A swap (e.g., total return swap) refers to a bilateral financial contract where a party agrees to make periodic payments, usually based on the London Inter-Bank Offered Rate ("LIBOR") plus some premium, to a counter-party in return for receiving the total economic performance of a specified asset at the end of the swap. The total economic performance generally is the sum of interest, dividends and other income and the change in value (i.e. appreciation or depreciation) of the underlying asset. A swap allows an investor to receive the economic exposure of asset ownership at a cost of only some premium above LIBOR without a substantial capital outlay. Swap counter-party risk can be limited by diversification with high quality counter-parties and by settling swaps prior to expiration if the accrued receivables from counter-parties become large.

Asset-liability matching refers to the degree to which an increase or decrease in the liabilities of a pension fund, insurance company, or other institutional investor due to market conditions is offset by an increase or decrease in the value of their assets. For example, a decrease in interest rates typically would increase the projected benefit obligation (PBO) of a pension fund as reported in their financial statements but could be offset to some degree by an increase in the value of fixed income assets in the fund.

Spending rule benefits refers to the ability of an investment program to deliver relatively consistent returns that help an endowment, foundation or other institutional investor with specified annual spending needs to achieve returns consistent with such needs.

Portfolios of certain types of alternative investments, such as a fund-of-funds (e.g., a low volatility fund of hedge funds), can generate high alpha with only small amounts of embedded equity and fixed income exposures.

Institutional investors often can be characterized as either seeking higher return and/or alpha by increasing their allocations to equities or other expected high return, high risk asset classes (e.g., venture capital) at the expense of risk, or seeking better asset-liability matching and/or spending rule benefits by increasing their allocations to fixed income at the expense of expected return and/or alpha. Many such investors believe that the expected return of equities is higher than that of fixed income. Many also believe that a higher alpha can be generated from equity managers than from fixed income managers even though equities cannot be relied upon for asset-liability matching or spending rule benefits.

Because many institutional investors believe that the long-term expected absolute returns of fixed income classes are lower than for equities or other expected high return, high risk assets classes, they often will tend to allocate less to fixed income classes and more to equities or other expected high return, high risk assets classes.

After selecting asset classes an institutional investor often will seek traditional equity and fixed income managers to generate excess returns from the stock and fixed income allocations. It is quite difficult, however, to find traditional investment managers who will significantly outperform indices like the S&P 500 or various Lehman fixed income indices over long periods of time. Traditional stock and fixed income managers typically are investing in very efficient markets, tend to have long-only securities, and tend to stay very close to their benchmark. As such, there is limited opportunity to generate alpha.

Accordingly, there exists a need for enhanced financial methods, products, and systems for managing fixed income portfolios that seek higher returns, higher alpha, better asset-liability matching, and/or better spending rule benefits.

SUMMARY

In one general respect, this application discloses a financial product. According to various embodiments, the financial product includes a fixed income component and an alpha engine component. The fixed income component is structured to provide at least one of the following: asset-liability matching among assets and projected liabilities; and spending rule benefits. The alpha engine component comprises an investment in an alpha-generating portfolio. The investment includes at least one of the following: a cash investment in the alpha-generating portfolio; and a derivative investment in the alpha-generating portfolio.

In another general respect, this application discloses a financial system. According to various embodiments, the financial system includes a provider system configured to provide a financial product. The financial product includes a fixed income component and an alpha engine component. The fixed income component is structured to provide at least one of the following: asset-liability matching among assets and projected liabilities; and spending rule benefits. The alpha engine component comprises an investment in an alpha-generating portfolio. The investment includes at least one of the following: a cash investment in the alpha-generating portfolio; and a derivative investment in the alpha-generating portfolio.

In another general respect, this application discloses a method. The method comprises designing a financial product that includes a fixed income component and an alpha engine component. The fixed income component is structured to provide at least one of the following: asset-liability matching among assets and projected liabilities; and spending rule benefits. The alpha engine component comprises an investment in an alpha-generating portfolio. The investment includes at least one of the following: a cash investment in the alpha-generating portfolio; and a derivative investment in the alpha-generating portfolio.

Aspects of the present invention may be implemented by a computer system and/or by a computer program stored on a computer readable medium. The computer readable medium may comprise a disk, a device, and/or a propagated signal.

Other features and advantages will be apparent from the following description, including the drawings, and from the claims.

DETAILED DESCRIPTION

The figures and descriptions of the disclosed invention have been simplified to illustrate elements that are relevant for a clear understanding of the disclosed invention. It should be understood that the methods, products, and systems described below may include various other processes, components, and elements in actual implementation.

Figure 1:
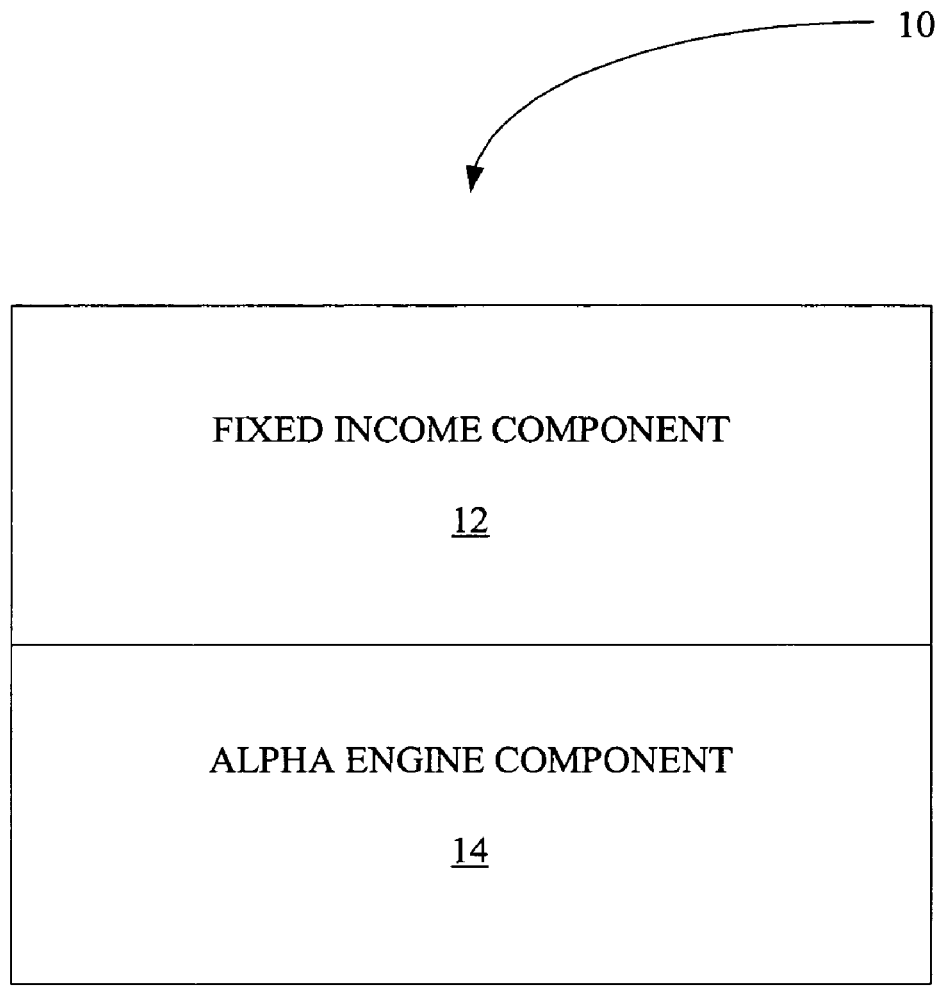
FIG. 1 illustrates various embodiments of a financial product.

FIG. 1 illustrates various embodiments of a portable alpha-plus fixed income product 10. The portable alpha-plus fixed income product 10 ("the financial product") may be embodied as one or more paper and/or electronic documents and generally may contain one or more rights and obligations in the context of a financial transaction. As shown, the financial product 10 includes a fixed income component 12 and an alpha engine component 14.

In various embodiments, the fixed income component 12 is structured and arranged to provide at least one of the following: asset-liability matching among assets and projected liabilities; and spending rule benefits. In various implementations, the fixed income component 12 comprises an investment in a fixed income portfolio. The investment may include at least one of the following: a cash investment in the fixed income portfolio; and a derivative investment in the fixed income portfolio. According to various embodiments, the investment in the fixed income portfolio may include any combination of cash investments and derivative investments in the fixed income portfolio. The derivative investment may include at least one of the following: a swap; a future; and an option. According to various embodiments, the derivative investment may include any combination of swaps, futures, options and any other derivatives. The fixed income portfolio may include at least one of the following: a bond (e.g., corporate bond, municipal bond, treasury bond, treasury note, treasury bill, zero-coupon bond, or any combination thereof), a money market instrument (e.g., short-term debt security, banker's acceptance, commercial paper, negotiable certificate of deposit, treasury bill with a maturity of less than one year, or any combination thereof); and preferred stock. According to various embodiments, the fixed income portfolio may include any combination of bonds, money market instruments, preferred stock and any other fixed income investments.

The fixed income component 12 may provide asset-liability matching among assets and projected liabilities by, for example, designing a portfolio having the duration, convexity and other characteristics that are similar to those of a client's liabilities.

The fixed income component 12 may provide spending rule benefits by, for example, providing low risk expected returns that exceed a client's spending rule requirements.

In various embodiments, the fixed income component 12 may further comprise an investment in an inflation-linked securities portfolio. The inflation-linked securities portfolio may be structured and arranged to reduce and/or offset the effect of inflation. In various implementations, the inflation-linked securities portfolio may comprise a portion of the fixed income portfolio and may include at least one of the following: a treasury inflation-protected security such as, for example, a U.S. Treasury Inflation Protected Securities (TIPS); an inflation-linked bond; and a synthetic inflation-linked security. According to various embodiments, the inflation-linked securities portfolio may include any combination of treasury inflation-protected securities, inflation-linked bonds, synthetic inflation-linked securities and any other inflation-linked securities.

The inflation-linked securities portfolio may serve to reduce and/or offset the effects of inflation by incorporating inflation-linked securities having returns contractually tied to inflation.

In various embodiments, the alpha engine component 14 is structured and arranged to generate excess returns over the passive return of a benchmark asset class. The expected excess returns from the alpha engine component 14 may generate expected excess returns that can offset a lower total portfolio expected return from a reduced equity component, allowing a higher allocation to the fixed income component 12 to help provide asset-liability matching, spending rule benefits and/or inflation protection. The excess returns (alpha) may be structured so that they can be transported to virtually any mix of fixed income securities and/or transported to non-US markets, with foreign exchange exposure hedged to the extent appropriate for a particular situation.

In various implementations, the alpha engine component 14 comprises an investment in an alpha-generating portfolio. The investment may include at least one of the following: a cash investment in the alpha-generating portfolio; and a derivative investment in the alpha-generating portfolio. According to various embodiments, the investment in the alpha-generating portfolio may include any combination of cash investments and derivative investments in the alpha-generating portfolio. The derivative investment may include at least one of the following: a swap; a future; and an option. According to various embodiments, the derivative investment may include any combination of swaps, futures, options and any other derivatives. The alpha-generating portfolio may comprise a fund-of-funds such as, for example, a fund of hedge funds. The fund-of-funds may include investments in a number of hedge funds employing a variety of strategies.

Using derivatives to make investments into the fixed income portfolio and/or the alpha-generating portfolio allows an optimal amount of exposure from each component that is greater than the amount of cash that the investor would be able to commit to the fixed income portfolio, the inflation-linked securities portfolio and the alpha-generating portfolio with direct investments. In some cases, swaps may be used to make the investment. In other cases, futures might be used for small adjustments since they can be implemented with simple trades rather than renegotiations as would be necessary to adjust swaps. Futures are also useful for certain types of fixed income overlays. Futures, however, require daily margin settlements. Options might also be attractive at times, with due consideration to resultant variations in hedge ratios (gamma), time premium decay, implied volatility and other special factors.

As described above, the financial product 10 may provide a custom tailored combination of fixed income and inflation-protected securities that is able to meet multiple needs of a client in one package. Many investors have multiple needs and prefer them to be addressed in a single package, with the individual interrelationships of the components being monitored and managed directly by the provider rather than by the investor.

Aspects of the financial product 10 may provide one or more of the following benefits. For example, the financial product 10 may facilitate a pension fund's higher allocation to fixed income and thus improve the matching of assets and liabilities. This would tend to reduce the accounting mismatch between the projected benefit obligation of the fund ("PBO") and asset valuations, since a rise or fall in the level of interest rates can have offsetting effects on PBO and short-term asset values.

An increase in the allocation to the fixed income portfolio typically would mean a reduced allocation to equities and, therefore, an expected lower overall portfolio volatility. This would lower the probability that a large negative stock market move would trigger cash contributions or reductions of spending rules. For example, this may be particularly important for pension plans that are underfunded or are close to a "contribution cliff," where contributions can rise sharply with only a small decrease in returns, and for endowments and foundations that have a somewhat inflexible spending rule.

The allocation to the inflation-linked securities portfolio can be particularly useful for salaried plans since rising inflation can require higher salary escalation assumptions in calculating the PBO. It can be useful for hourly plans as well, since inflation affects hourly costs over time, even though escalation assumptions are not necessarily picked up in the actuarial calculations that set cash contributions. Endowments and foundations may find inflation protection useful for their spending needs when alpha can be added to an otherwise low expected-return asset class.

The allocation to the alpha-generating portfolio can have the effect of raising expected alpha enough to offset or even improve the impact on expected returns that might result from a decreased allocation to equities.

Many types of institutions such as pension funds, endowments, foundations and insurance companies take the structure of their liabilities into account when designing a target asset mix, and interest rates and inflation in particular affect many such liabilities. Often, these institutions make tradeoffs between their desires for high returns and their preference for asset/liability matching, consistency of returns and inflation protection. In the absence of the financial product 10, an institution's ability to invest cash in a mix of fixed income, inflation-linked securities, and alpha-producing hedge funds could be limited by the amount of cash available for such investments.

These institutions could benefit, therefore, from an individually tailored financial product 10 that provides a degree of asset/liability matching, lower volatility and inflation protection, while maintaining adequately high expected returns.

Endowments and foundations can also benefit from the financial product 10. Although they do not have the same actuarial accounting issues as pension funds, unexpected inflation and volatility impact these institutions. Tax-exempt foundations are required to pay out 5% of their assets each year and they are usually reluctant to reduce the real value of their payouts when the returns of their portfolio decline. Lower volatility and a degree of inflation protection would thus be helpful to them. Endowments do not have the 5% requirement, but they might not easily be able to reduce costs, such as teaching staff size and compensation, just because returns decline, and in fact their costs are likely to rise somewhat with inflation.

Portable alpha can be used to transfer alpha and not undesired risk. In this respect, a fund-of-funds having low expected embedded fixed income and equity exposures and volatility is particularly attractive for the alpha engine component 14. Other types of find-of-funds having wide variations in embedded exposures would be less suitable for transporting alpha to fixed income because it is difficult to determine, in advance, how much additional exposure is needed to achieve the desired aggregate target exposures. Total fixed income exposure with such funds might deviate unpredictably and in significant amounts from time to time, which could be problematic unless the investor wanted such deviations as part of a market-timing strategy.

Figure 2:
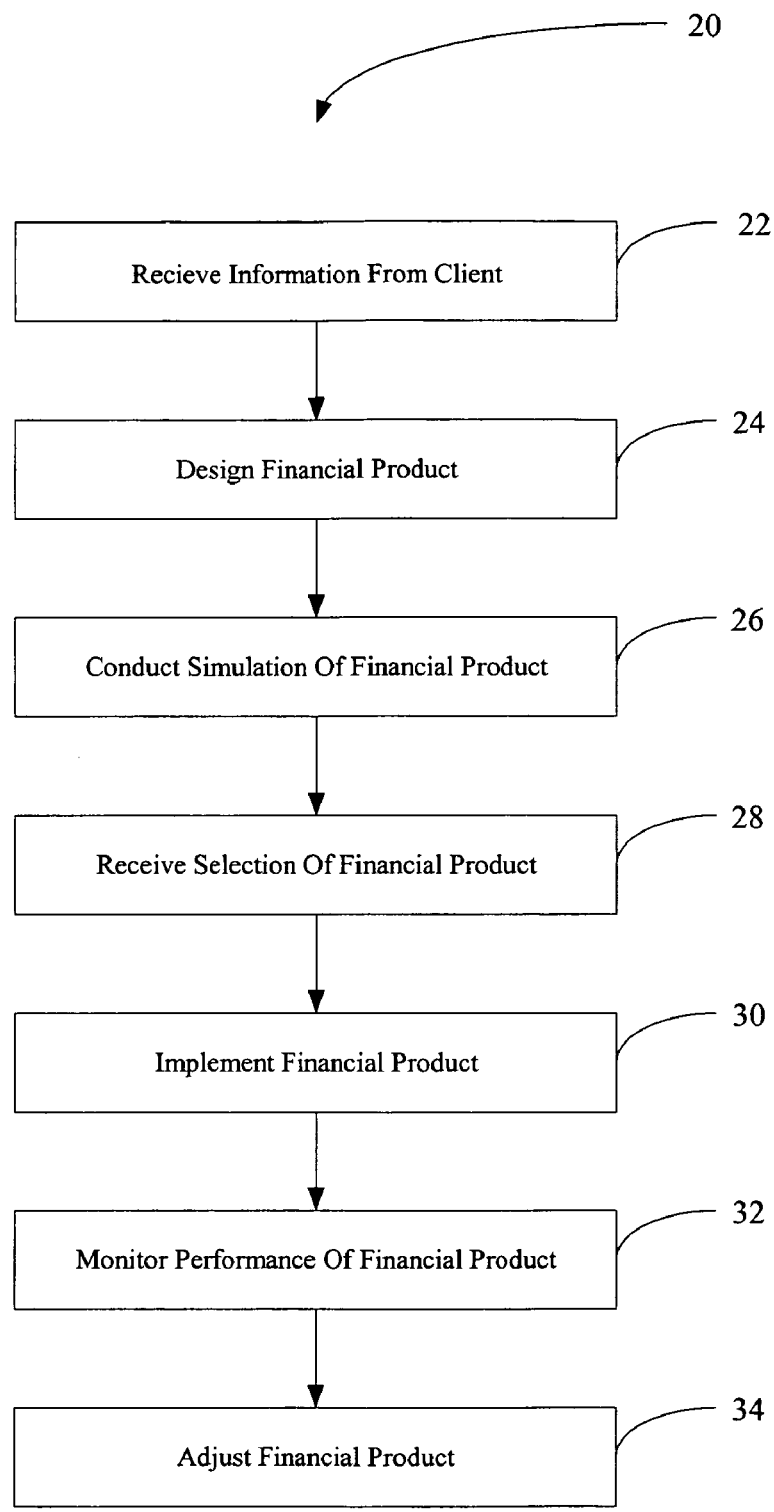
FIG. 2 illustrates various embodiments of a financial method.

FIG. 2 illustrates various embodiments of a financial method 20 for managing fixed income portfolios. In various implementations, the financial method 20 may be implemented at least in part by hardware (e.g., device, computer, computer system, equipment, component); software (e.g., program, application, instruction set, code); storage medium (e.g., disk, device, propagated signal); or combination thereof. It should be noted, however, that the financial method 20 may be performed in any manner consistent with aspects of the disclosed invention. The hardware and software may be used to generate printed materials such as, for example, agreements, guidelines, regressions, scatter charts, etc. associated with the financial product 10.

At step 22, a provider receives information from a client. In one implementation, the provider may include, form part of, or be associated with a financial services entity structured and arranged to provide financial services such as, for example, securities services, investment management services, and/or credit services. The client may include, form part of, or be associated with an investor, investing entity, and/or customer of the provider. The provider and client may include or utilize various hardware, software, and/or storage mediums for providing and receiving financial services.

In general, the provider solicits and receives information from the client in order to gain an understanding of the client's fund (e.g., assets, liabilities, investment resources) and investment objectives (e.g., inflation protection, duration protection, asset-liability matching, spending rule benefits and/or liquidity needs). Examples of information that may be requested by and supplied to the provider include, but are not limited to: assets and liabilities (e.g., in US dollars or other currency), duration and nature of assets and liabilities, nature of the expected outflows (e.g., based upon employee demographics and/or payout requirements), the expected effect of inflation on future liabilities and payouts, liquidity needed to satisfy annual payouts, tax considerations (e.g., tax situation, tax consequences, requirements to retain tax-exempt status), investment preferences about asset portfolio volatility (e.g., expectations and risk tolerance), and accounting nuances of assets and liabilities.

At step 24, the provider designs one or more financial products 10 based upon the client information. In various embodiments, the financial product 10 is designed to include the fixed income component 12 and the alpha engine component 14. In general, the provider uses the client information to design one or more potential financial products 10 believed to satisfy the needs and expectations of a particular client. The client information may be used, for example, to tailor the allocation of assets within the financial product 10. For instance, client information such as accounting concerns for a pension fund, tax considerations for endowments and foundations, non-U.S. liabilities, foreign exchange considerations, and preferences and risk tolerance of a client may impact the allocation of the fixed income component 12 and the alpha engine component 14 within the financial product 10.

At step 26, the provider conducts one or more simulations of the designed financial products 10. In general, the provider conducts simulations to illustrate expected return scenarios, liabilities and/or spending concerns. The simulations may determine the characteristics, the long-term expected return, the asset-liability matching, the volatility, the skewness (asymmetry), and/or kurtosis (fat-tails in the distribution of returns) for the various financial products 10.

At step 28, the provider receives a selection from the client of a particular financial product 10. In general, based on the simulations, the client makes an informed selection of a particular financial product 10.

At step 30, the provider implements the financial product 10. In general, the provider implements the financial product 10 by making a combination of one or more cash investments and one or more derivative investments. A cash investment may be made in at least one of the following: a fixed income portfolio; and an alpha-generating portfolio. Similarly, a derivative investment may be made in at least one of the following: a fixed income portfolio; and an alpha-generating portfolio. In addition, one or more cash investments, one or more derivative investments, or any combination thereof may also be made in an inflation-linked securities portfolio.

The target characteristics specified by a client determine the particular mix of investments made to implement the financial product 10. The investments may be allocated such that the aggregate of the characteristics embedded in the various portfolios together equal the target characteristics specified by the client. The embedded characteristics of the various portfolios are determined using one or more of linear regressions, multiple regressions and downside regressions of the monthly returns of the alpha engine component 14 on the fixed income index or indices specified as benchmarks by a client. Other mathematical techniques and experience-based qualitative assessments may also be used to estimate the embedded exposures in the fixed income component 12 and the alpha engine component 14.

Many combinations and permutations can be used to implement the financial product 10. The actual mix of the fixed income portfolio, the inflation-linked securities portfolio and the alpha-generating portfolio may be tailored to the specific needs of a client and in addition can be implemented in a number of different ways depending upon client preferences.

For example, a given financial 10 may include a $60M direct cash investment in a fixed income portfolio, a $40M direct cash investment in an inflation-linked securities portfolio and a $50M swap exposure to a fund-of-funds (with a Treasury bill benchmark). If the swap interest rate is a spread over LIBOR equivalent to 1% above T-bill returns and the expected average fund-of-funds alpha after fees is 5-10% over T-bills, the above would generate an alpha of 4-9% on the fund-of-funds allocation.

In various implementations, synthetic exposure to equity or fixed income is added to or subtracted from the apha engine component 14 to achieve the market exposures that the client desires. In such instances, the implementation of the alpha engine component 14 is not limited to stock-picking managers and bond-picking managers. Any kind of investment manager that is capable of generating excess returns can be used. Such investment managers may employ a variety of arbitrage strategies, long and short strategies, and investments in private equity and hedge funds where significant expected alphas over relevant benchmarks are obtainable.

For example, a given pension fund may have $1 billion in cash available for investment. An allocation of $200 million or 20% is directly invested in cash into a low-volatility fund of hedge funds. An allocation of $400 million or 40% is directly invested in cash with stock-picking managers, and an allocation of $100 million or 10% is directly invested in cash into private equity. Another $200 million or 20% is directly invested in cash into fixed income, with the remaining $100 million or 10% in cash. The effective asset mix is thus 20% in hedge funds, 50% in stocks and private equity, 20% in fixed income and 10% in cash.

Swaps, such as total return swaps, then are made into additional hedge funds equal to $200 million or 20% of the pension fund's value. The $200 million in swaps plus the $200 million that is in direct cash investments into hedge funds adds up to 40% of the value of the pension fund. To the extent such hedge funds have low volatility and low correlation with the other investments in the pension fund, they add little risk to the portfolio.

In this example, the alpha engine component 14 (e.g., the investment in the fund of hedge funds and the additional hedge funds) is equal to 40% of the value of the pension fund. The alpha engine component 14 can then be combined with synthetic fixed income exposure using swaps or other derivatives as needed so the aggregate of the exposures embedded in the alpha engine component 14 plus the exposures embedded in the fixed income component 12 match the liability objectives of the pension fund.

In various embodiments, synthetic exposure to equity or fixed income is added to or subtracted from the fixed income component 12 to obtain a fixed income target and/or inflation-linked target. For example, if the client has identified a fixed income and/or inflation-linked target of 35% but has only 20% in direct fixed-income exposure, an additional 15% can be added using swaps into fixed income (e.g., bond indexed funds, exchange traded funds) and/or inflation-linked securities (e.g., U.S. Barclays Index Treasury Inflation Protected Securities) to supplement the amount in direct form. It is noted that the additional amount that is swapped into fixed income and/or TIPS may not add significant volatility to the pension fund, and in fact is designed to help meet the client's asset-liability, spending rule benefits and/or inflation concerns. The volatility of the portfolio may in fact be lowered by reducing the exposure to stocks.

At step 32, the provider monitors performance of the financial product 10. In general, the financial product 10 is monitored over time as market conditions change. In various implementations, the provider monitors the interrelationships among the components and the returns developed in each component.

At step 34, the provider provides adjustments to the financial product 10. In general, the provider provides periodic rebalancing and other necessary adjustments based on the interrelationships among the components and the returns developed in each component.

It should be noted that certain assumptions have been made regarding the information included, and such information is presented by way of example only. No representation is made that a particular performance will be achieved by the financial product 10, or that every assumption made in presenting the information has been considered or stated in preparing it. Historical performance information is not indicative of future performance or investment returns, and prospective investors should not view the information as an indicator of the future performance of a particular financial product 10.

Figure 3:
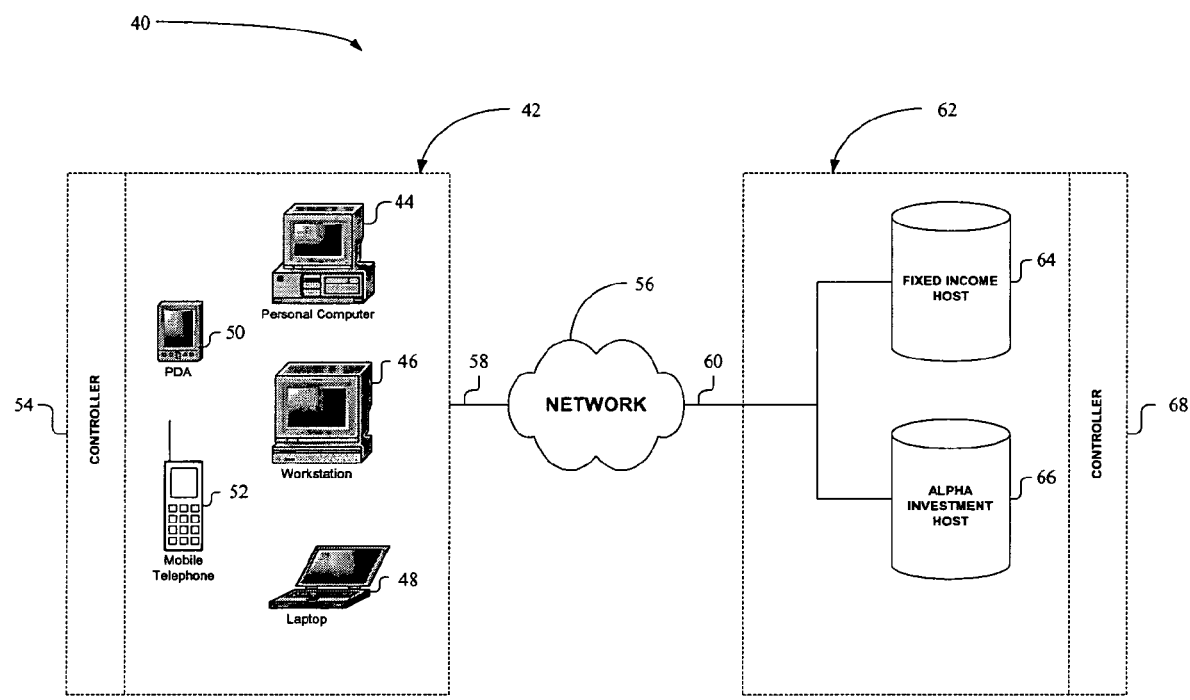
FIG. 3 illustrates various embodiments of a financial system.

FIG. 3 illustrates various embodiments of a financial system 40. In general, one or more elements of the financial system 40 may perform the method 20 and/or may implement the financial product 10, as described above.

As shown, the financial system 40 includes a client system 42 for presenting information to and receiving information from a user. The client system 42 may include one or more client devices such as, for example, a personal computer (PC) 44, a workstation 46, a laptop computer 48, a network-enabled personal digital assistant (PDA) 50, and a network-enabled mobile telephone 52. Other examples of a client device include, but are not limited to a server, a microprocessor, an integrated circuit, fax machine or any other component, machine, tool, equipment, or some combination thereof capable of responding to and executing instructions and/or using data.

In various implementations, the client system 42 operates under the command of a client controller 54. The broken lines are intended to indicate that in some implementations, the client controller 54, or portions thereof considered collectively, may instruct one or more elements of the client system 42 to operate as described. Examples of a client controller 54 include, but are not limited to a computer program, a software application, computer code, set of instructions, plug-in, applet, microprocessor, virtual machine, device, or combination thereof, for independently or collectively instructing one or more client devices to interact and operate as programmed.

The client controller 54 may be implemented utilizing any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The client controller 54 (e.g., software application, computer program) may be stored on a computer-readable medium (e.g., disk, device, and/or propagated signal) such that when a computer reads the medium, the functions described herein are performed.

In general, the client system 54 may be connected through a network 56 having wired or wireless data pathways 58, 60 to provider system 62. The network 56 may include any type of delivery system including, but not limited to a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 56 may include elements, such as, for example, intermediate nodes, proxy servers, routers, switches, and adapters configured to direct and/or deliver data.

In general, the client system 42 and the provider system 62 each include hardware and/or software components for communicating with the network 56 and with each other. The client system 42 and provider system 62 may be structured and arranged to communicate through the network 56 using various communication protocols (e.g., HTTP, TCP/IP, UDP, WAP, WiFi, Bluetooth) and/or to operate within or in concert with one or more other communications systems.

The provider system 62 generally hosts a set of resources for a group of users. As shown, the provider system 62 may include a fixed income host 64 and an alpha investment host 66. In various embodiments, the fixed income host 64 and the alpha investment host 66 are configured to collaborate in investment research, market research, product design, staffing, trading, controls, monitoring, marketing and client service.

In various implementations, the fixed income host 64 is configured to tailor fixed income and inflation-linked securities portfolios for clients. The fixed income host 64 may be configured to select from a wide variety of instruments including bonds, futures, options and swaps into exchange traded funds or fixed income indices for such portfolios.

In various implementations, the alpha investment host 66 is configured to manage a fund-of-funds, advising the fixed income host 64 of estimates of bond exposure, if any, embedded in such fund-of-funds so that appropriate adjustments in the fixed income and inflation-linked securities portfolios can be made.

In various embodiments, the fixed income host 64 and the alpha investment host 66 are configured to be jointly responsible for client reporting and for making exposure adjustments from time to time as alpha is generated and/or as the client's total fund asset mix drifts. The fixed income host 64 and the alpha investment host 66 may interact with the client for managing cash settlements to swap counter-parties, futures margin flows, and other cash settlement requirements.

Each of the fixed income host 64 and the alpha investment host 66 may be implemented by one or more servers (e.g., IBM® OS/390 operating system servers, Linux operating system-based servers, Windows NT™ servers) providing one or more assets (e.g., storage arrays, applications) to the group of users.

In various implementations, the provider system 62 operates under the command of a provider controller 68. The broken lines are intended to indicate that in some implementations, the provider controller 68, or portions thereof considered collectively, may instruct one or more elements of provider system 62 to operate as described. Examples of a provider controller 68 include, but are not limited to a computer program, a software application, computer code, set of instructions, plug-in, microprocessor, virtual machine, device, or combination thereof, for independently or collectively instructing one or more computing devices to interact and operate as programmed.

In general, provider controller 68 may be implemented utilizing any suitable algorithms, computing language (e.g., C, C++, Java, JavaScript, Perl, Visual Basic, VBScript, Delphi) and may be embodied permanently or temporarily in any type of computer, computer system, device, machine, component, physical or virtual equipment, storage medium, or propagated signal capable of delivering instructions. The provider controller 68 when implemented as software or a computer program, for example, may be stored on a computer-readable medium (e.g., device, disk, or propagated signal) such that when a computer reads the medium, the functions described herein are performed.

Figure 4:
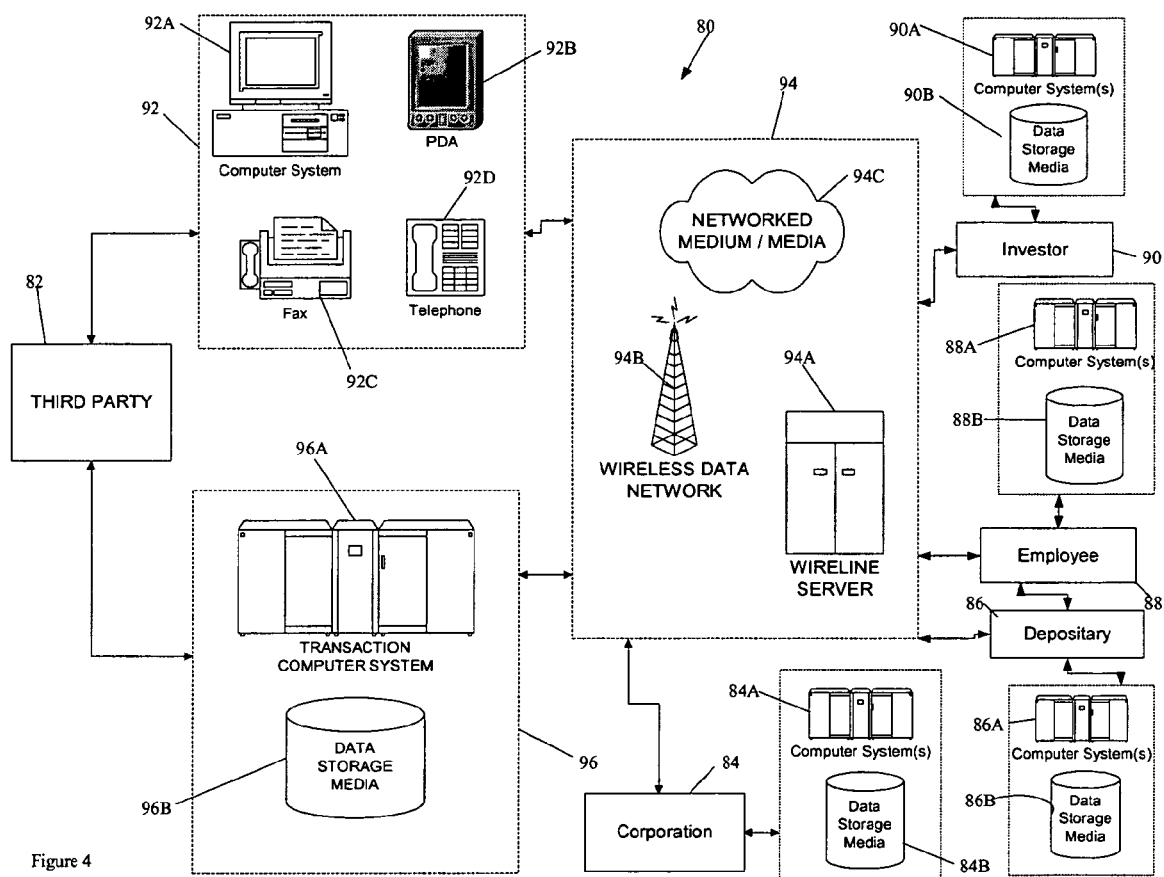
FIG. 4 illustrates various embodiments of a financial system.

FIG. 4 illustrates various embodiments of a financial system 80 in which aspects of the disclosed invention may be implemented. In general, one or more elements of the financial system 80 may perform the method 20 and/or may implement the financial product 10, as described above.

As shown, a third party 82 such as, for example, an underwriter, an investment bank, or another type of entity can communicate and/or exchange data with one or more of a corporation 84, a depository 86 (e.g. The Depository Trust Company), an employee 88 and/or an investor 90. In various implementations, the depository 86 may assign a unique identification such as a Committee Uniform Securities Identification Procedures (CUSIP) number, for example, to each security approved for trading. The CUSIP number may be used to track buy and sell orders for the units during issue and/or remarketing.

In various aspects, the third party 82 can be operatively associated with one or more communications devices 92 such as, for example and without limitation, a computer system 92A, a personal digital assistant 92B, a fax machine 92C, and/or a telephone 92D (e.g., a wireline telephone, a wireless telephone, a pager, and the like), and/or other like communication devices. The communication devices 92 may permit the third party 82, the corporation 84, the depositary 86, the employee 88 and/or the investor 90 to communicate between/among each other through one or more communication media 94, such as by use of electronic mail communication through one or more computer systems, for example.

The communication media 94 can include, for example and without limitation, wireline communication means such as a wireline server 94A, a wireless data network 94B, and/or a connection through a networked medium or media 94C (e.g., the Internet). In addition, the third party 82 (as well as any one or more of the corporation 84, the depositary 86, the employee 88 and/or the investor 90) can be operatively associated with one or more data processing/storage devices 96.

As illustrated in FIG. 4, the third party 82 can be operatively associated with a transaction computer system 96A, for example, and/or one or more data storage media 96B that can receive, store, analyze and/or otherwise process data and other information in association with communications that occur between/among the third party 82, the corporation 84, the depositary 86, the employee 88 and/or the investor 90.

In various aspects, the corporation 84 can be operatively associated with one or more computer systems 84A and/or one or more data storage media 84B. In another aspect, the depositary 86 can be operatively associated with one or more computer systems 86A and/or one or more data storage media 86B. In various aspects, the employee 88 can be operatively associated with one or more computer systems 88A and/or one or more data storage media 88B.

In various aspects, the investor 90 can be operatively associated with one or more computer systems 90A and/or one or more data storage media 90B. It can be appreciated that one or more of the computer systems (e.g., 84A, 86A, 88A, 90A, 96A) and one or more of the data storage media (e.g., 84B, 86B, 88B, 90B, 96B) can be employed to communicate, store, analyze, and/or otherwise process data related to financial transactions occurring between and/or among the third party 82, the corporation 84, the depositary 86, the employee 88 and/or the investor 90.

The benefits of the present methods, systems and computer-readable media are readily apparent to those skilled in the art. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves. The various portions and components of various embodiments of the present invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the disclosed invention as defined by the appended claims.

What is claimed is:

1. A method for investing funds of an investor, the method comprising:

storing data regarding the investor in a computer database, wherein the data comprises a liability objective for the investor for the funds;

analyzing a number of computer-implemented simulations performed by a computer system to determine return characteristics for potential investments of the funds, wherein the return characteristics comprise expected returns and at least one distribution characteristic of the expected returns, wherein the computer system comprises at least one computer with a processor and a memory;

investing a first portion of the funds in an alpha-generating portfolio based on the analysis of the simulations, wherein the alpha-generating portfolio is a portfolio for generating a return, a portion of which comprises an alpha return portion that is a return over a passive return of a benchmark;

investing a second portion of the funds in a fixed-income portfolio;

performing a first computer-implemented quantitative analysis of a return of the alpha-generating portfolio by the computer system to determine one or more first exposures of the alpha-generating portfolio;

performing a second computer-implemented quantitative analysis of a return of the fixed-income portfolio by the computer system to determine one or more second exposures of the fixed-income portfolio; and entering into one or more derivative contracts to add a third exposure to the one or more first exposures of the alpha-generating portfolio and the one or more second exposures of the fixed-income portfolio such that a sum of the first, second, and third exposures equals a target exposure of the investor that is based on the liability objective of the investor for the funds.

2. The method of claim 1, wherein investing a second portion of the funds in a fixed-income portfolio comprises investing in an inflation-linked securities portfolio.

3. The method of claim 2, wherein investing in an inflation-linked securities portfolio comprises investing in at least one of:

a treasury inflation protected security;

an inflation-linked bond; and a synthetic inflation-linked security.

4. The method of claim 1, wherein investing a first portion of the funds in an alpha-generating portfolio comprises at least one of:

making a cash investment in an alpha-generating portfolio; and making a derivative investment in an alpha-generating portfolio.

5. The method of claim 4, wherein making a derivative investment in an alpha-generating portfolio comprises making an investment using at least one of:
- a swap;
- a future; and
- an option.

6. The method of claim 1, wherein investing a first portion of the funds in an alpha-generating portfolio comprises investing in a fund-of-funds.

7. The method of claim 1, wherein investing a first portion of the funds in an alpha-generating portfolio comprises investing in a fund of hedge funds.

8. The method of claim 1, where the first computer-implemented quantitative analysis comprises at least one regression.

9. The method of claim 1, wherein the alpha-generating portfolio, the fixed-income portfolio, and the one or more derivative contracts have an aggregate duration that substantially matches a duration of a liability of the investor.

10. The method of claim 9, wherein the alpha-generating portfolio, the fixed-income portfolio, and the one or more derivative contracts have an aggregate convexity that substantially matches a convexity of a liability of the investor.

11. The method of claim 1, further comprising:
monitoring the alpha-generating portfolio and the fixed-income portfolio over a time period using a computer; and
adjusting the first, second and/or third exposures based on the monitoring.

12. The method of claim 1, wherein investing a second portion of the funds in a fixed-income portfolio comprises making a derivative investment in a fixed-income portfolio.

13. The method of claim 1, further comprising:
performing one or more computer-implemented simulations to determine expected return scenarios for the alpha-generating portfolio and the fixed income portfolio; and
determining an allocation of the funds between the alpha-generating portfolio and the fixed income portfolio based, in part, on results from the one or more simulations.

14. The method of claim 1, wherein the benchmark is based on one or more indices.

15. The method of claim 8, wherein the at least one regression comprises a regression selected from the group consisting of a linear regression, a multiple regression, and a downside regression.

16. The method of claim 1, wherein the one or more derivative contracts comprise a derivative contract selected from the group consisting of:
- a swap;
- a future; and
- an option.

17. The method of claim 1, wherein entering into one or more derivative contracts includes determining, by the computer system, whether the sum of the first, second and third exposures equals the target exposure.

* * * * *